(12) United States Patent
Bandi et al.

(10) Patent No.: US 12,373,865 B2
(45) Date of Patent: Jul. 29, 2025

(54) VEHICLE-CENTRIC ROAD USAGE APPLICATION USING VEHICLE SENSORS

(71) Applicant: FORD GLOBAL TECHNOLOGIES, LLC, Dearborn, MI (US)

(72) Inventors: Krishna Bandi, Farmington Hills, MI (US); Sathyanarayana Chary Palakonda, Northville, MI (US); Brennan Hamilton, Birmingham, MI (US); Ivan Vukovic, Birmingham, MI (US); Swetha Shailendra, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 128 days.

(21) Appl. No.: 18/160,408

(22) Filed: Jan. 27, 2023

(65) Prior Publication Data
US 2024/0257192 A1    Aug. 1, 2024

(51) Int. Cl.
  *G06Q 30/0283*    (2023.01)
  *G06Q 20/32*    (2012.01)
  *H04W 4/44*    (2018.01)

(52) U.S. Cl.
  CPC ....... *G06Q 30/0284* (2013.01); *G06Q 20/325* (2013.01); *H04W 4/44* (2018.02)

(58) Field of Classification Search
  CPC .......................... G06Q 30/0284; H04W 4/44
  See application file for complete search history.

(56) References Cited

U.S. PATENT DOCUMENTS

| 11,405,763 B1 | 8/2022 | Bandi et al. |
| 2009/0030604 A1* | 1/2009 | Fujita ............... G01C 21/3826 |
| | | 701/516 |

(Continued)

OTHER PUBLICATIONS

Arnesen, Petter et al.; "Geofencing to Enable Differentiated Road User Charging"; Published Feb. 28, 2021; Journal of the Transportation Research Board; vol. 2675, Issue 7; pp. 299-306, document pp. 1-8; accessed from https://journals.sagepub.com/doi/full/10.1177/0361198121995510?cookieSet=1 (Year: 2021).*

(Continued)

*Primary Examiner* — Resha Desai
*Assistant Examiner* — Michael C Moroney
(74) *Attorney, Agent, or Firm* — Joseph Zane; Brooks Kushman P.C.

(57) ABSTRACT

Computing vehicle-centric road usage without high definition (HD) road maps is performed. Road usage charging (RUC) charge geometry rules defining a zone in which RUC are charged are received via a V2X transceiver of a vehicle. The vehicle determines a roadway type based on captured sensor data indicative of the surroundings of the vehicle, the roadway type being selected from a plurality of roadway types including a first roadway type where RUC charge is incurred and a second roadway type where RUC charge is not incurred. The vehicle identifies applicable rules of the RUC charge geometry rules according to a current location of the vehicle, the applicable rules specifying how tariffs are computed for the determined roadway type. The vehicle accumulates, by the vehicle, vehicle RUC charge using vehicle bus data indicative of progress of the vehicle within the zone and the determined roadway type.

16 Claims, 12 Drawing Sheets

(56) References Cited

U.S. PATENT DOCUMENTS

| | | | |
|---|---|---|---|
| 2010/0070349 A1 | 3/2010 | Daems | |
| 2012/0209776 A1* | 8/2012 | Nagy | G07B 15/063 |
| | | | 705/13 |
| 2013/0031029 A1* | 1/2013 | Davidson | G07C 5/0825 |
| | | | 705/417 |
| 2015/0211867 A1* | 7/2015 | Nagy | B60W 50/00 |
| | | | 702/189 |
| 2017/0092125 A1* | 3/2017 | Fujimaki | G08G 1/09626 |
| 2018/0091930 A1 | 3/2018 | Jefferies | |
| 2019/0385449 A1* | 12/2019 | Pateropoulos | G08G 1/04 |
| 2020/0211226 A1* | 7/2020 | Kundu | G06V 20/582 |
| 2020/0364467 A1* | 11/2020 | Wang | G06V 20/52 |
| 2020/0370901 A1* | 11/2020 | Konchenko | G01C 21/20 |
| 2021/0124990 A1* | 4/2021 | Lian | G06V 20/10 |
| 2021/0183169 A1* | 6/2021 | Borras | G01S 19/14 |
| 2022/0058403 A1* | 2/2022 | Huang | G06Q 10/063 |
| 2022/0092884 A1 | 3/2022 | Basir et al. | |
| 2023/0234609 A1* | 7/2023 | Fujimoto | B60W 60/001 |
| 2023/0298388 A1* | 9/2023 | Van Duren | G07B 15/06 |
| | | | 705/71 |

OTHER PUBLICATIONS ai.facebook (Nov. 1, 2022)—Mapping roads website. Retrieved from https://ai.facebook.com/blog/mapping-roads-through-deep-learning-and-weakly-supervised-training/.

Mapwith.ai website (Nov. 1, 2022). Retrieved from https://mapwith.ai/.

* cited by examiner

VEHICLE-CENTRIC ROAD USAGE APPLICATION USING VEHICLE SENSORS

TECHNICAL FIELD

Aspects of the disclosure generally relate to a vehicle-centric road usage application that uses vehicle sensors and machine learning, without dependence on high definition (HD) road maps.

BACKGROUND

Road usage charging (RUC), sometimes referred to as vehicle miles traveled (VMT) fees or mileage-based user fees (MBUF), is a policy whereby motorists pay for use of the roadway network as a function of distance traveled. VMT may not be the only input to fee computation, as time-of-day or time spent on the road may be an input to the fee calculation as well.

As with tolling, RUC is a direct user fee that supports a "user pays" principle of transportation funding, as well as the notion of managing road networks as utilities. Whereas toll systems are generally deployed on one or several facilities, such as an expressway corridors, bridges, or tunnels, road usage charges may apply to all roads in a defined jurisdiction or geography at all times. RUC can be implemented using a wide range of approaches, from paper licenses and odometer readings to automated technologies, such as in-vehicle devices and telematics systems built into vehicles.

SUMMARY

In one or more illustrative examples, a vehicle for computing vehicle-centric road usage without HD road maps is provided. The vehicle includes a vehicle-to-everything (V2X) transceiver, a memory maintaining a vehicle-based road usage charge application, and a processor. The processor is programmed to execute the vehicle-based road usage charge application to perform operations including to receive, via the V2X transceiver, RUC charge geometry rules defining a zone in which RUC are charged, determine a roadway type based on captured sensor data indicative of the surroundings of the vehicle, the roadway type being selected from a plurality of roadway types including a first roadway type where RUC charge is incurred and a second roadway type where RUC charge is not incurred, identify applicable rules of the RUC charge geometry rules according to a current location of the vehicle, the applicable rules specifying how tariffs are computed for the determined roadway type, accumulate vehicle RUC charge using vehicle bus data indicative of progress of the vehicle within the zone and the determined roadway type, provide, via the V2X transceiver, a message indicative of the vehicle RUC charge.

In one or more illustrative examples, a method for computing vehicle-centric road usage without HD road maps is performed. The method includes receiving, via a V2X transceiver of a vehicle, RUC charge geometry rules defining a zone in which RUC are charged. The method includes determining, by the vehicle, a roadway type based on captured sensor data indicative of the surroundings of the vehicle, the roadway type being selected from a plurality of roadway types including a first roadway type where RUC charge is incurred and a second roadway type where RUC charge is not incurred. The method includes identifying, by the vehicle, applicable rules of the RUC charge geometry rules according to a current location of the vehicle, the applicable rules specifying how tariffs are computed for the determined roadway type. The method includes accumulating, by the vehicle, vehicle RUC charge using vehicle bus data indicative of progress of the vehicle within the zone and the determined roadway type. The method includes providing, via the V2X transceiver, a message indicative of the vehicle RUC charge.

In one or more illustrative examples, a non-transitory computer-readable medium includes instructions for computing vehicle-centric road usage without HD road maps that, when executed by one or more controllers of a vehicle, cause the vehicle to perform operations including to receive, via a V2X transceiver of a vehicle, RUC charge geometry rules defining a zone in which RUC are charged; determine, by the vehicle, a roadway type based on captured sensor data indicative of the surroundings of the vehicle, the roadway type being selected from a plurality of roadway types including a first roadway type where RUC charge is incurred and a second roadway type where RUC charge is not incurred, including to perform a semantic segmentation of the captured sensor data to label elements in the captured sensor data, and to infer the determined roadway type according to the labeled elements; identify, by the vehicle, applicable rules of the RUC charge geometry rules according to a current location of the vehicle, the applicable rules specifying how tariffs are computed for the determined roadway type; accumulate, by the vehicle, vehicle RUC charge using vehicle bus data indicative of progress of the vehicle within the zone and the determined roadway type; and provide, via the V2X transceiver, a message indicative of the vehicle RUC charge.

DETAILED DESCRIPTION

Figure 1:
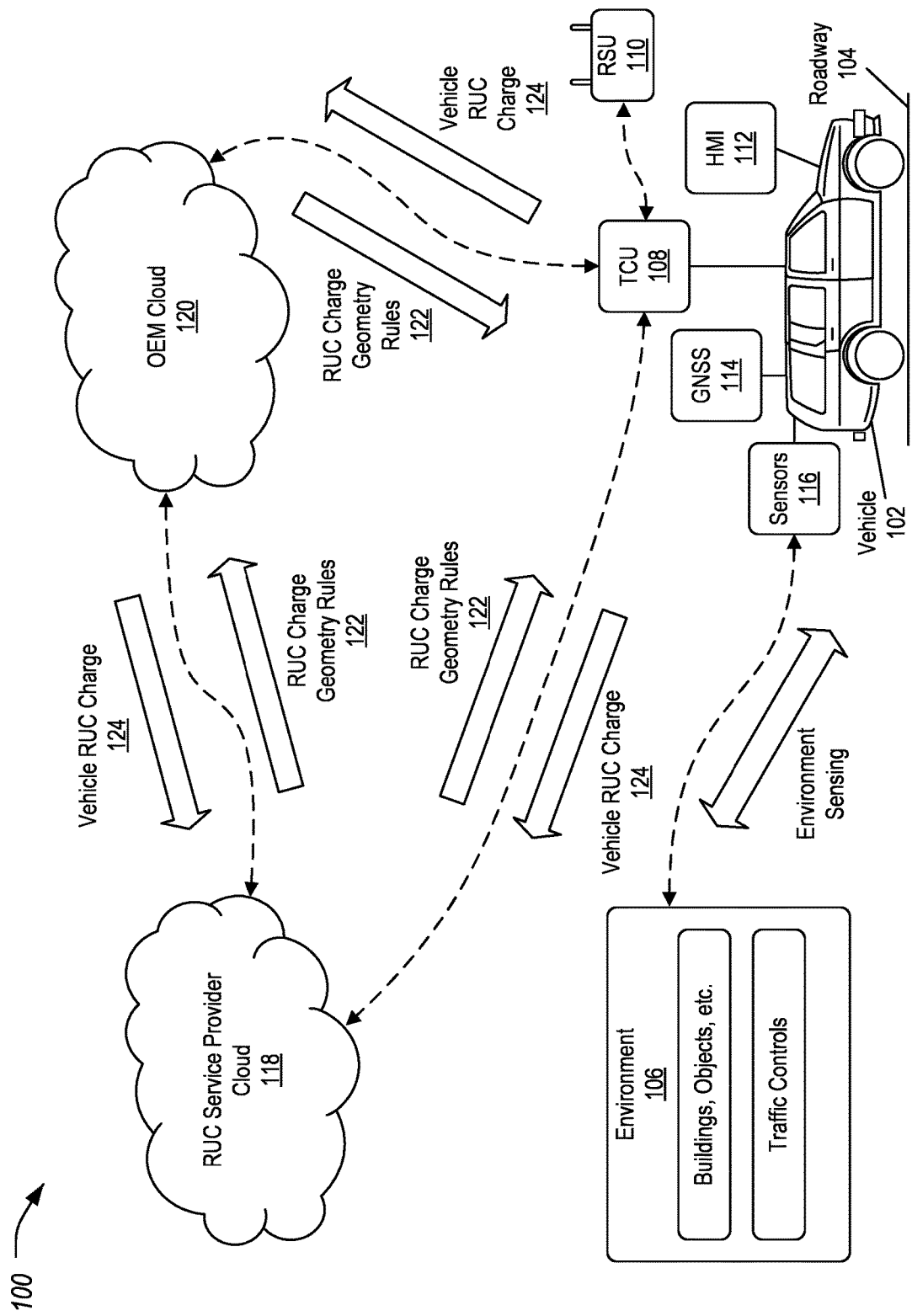
FIG. 1 illustrates an example system for the performance of vehicle-centric road usage determination without dependence on HD road maps.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

RUC is the concept of charging vehicles for their usage of metered roads. RUC is an alternate mechanism to a surcharge on fuel purchased for electric vehicles or to charging drivers a fee based on miles driven. To identify whether a vehicle is driving along a roadway for which a fee is due, a RUC application on vehicle may utilize HD maps that describe the locations of drivable roads within an area. The HD maps may specify geographic information about the roadways, such as location within a state, province, county, city, etc. The HD maps may also specify whether the roadway is a public road or a private road, and/or the different lanes of the roadway. Yet, maintaining, updating, and storing the HD maps for all possible roadways is a complex task, requiring computation effort to compose the maps, as well as frequent updating of these maps which affects data-plan usage.

Smartphone-based RUC applications may be used without HD maps. However, such systems have many disadvantages. For example, a driver may evade charges by turning the phone off, or by not bringing the phone along on a trip. Additionally, the user may have privacy concerns with the sharing of the user's phone location with the road charge infrastructure. Accuracy of such systems may be low. It may also be difficult to correlate the vehicle being used to the RUC account to be charged.

An enhanced vehicle-based RUC system may utilize machine learning, in the place of HD maps, to use sensor data to infer charge-related aspects of drivable roadways within an area. These aspects may include whether a road is public or private, as well as the lane of travel of the vehicle.

The vehicle may utilize a vehicle-based road usage charge application to receive RUC charge geometry rules defining a zone in which RUC are charged. The vehicle-based road usage charge application may determine a roadway type based on captured sensor data indicative of the surroundings of the vehicle. For instance, the application may use machine learning models to output a RUC localization indicative of the type of roadway being traversed. Based on the roadway type, the vehicle-based road usage charge application may identify applicable rules of the RUC charge geometry rules according to a current location of the vehicle, the applicable rules specifying how tariffs are computed for the determined roadway type. The vehicle may accumulate vehicle RUC charge using vehicle bus data indicative of progress of the vehicle within the zone and the determined roadway type, for example using state machine logic. The application may use the vehicle RUC charge for various purposes, such as the charging of the vehicle for the road usage, as well as informing the vehicle occupants of the charge.

FIG. 1 illustrates an example system 100 for the performance of vehicle-centric road usage determination without dependence on HD road maps. As shown, the system 100 includes a wireless-enabled vehicle 102 configured to travel along a roadway 104 within an environment 106. Among other things, the vehicle 102 includes a telematics control unit (TCU) 108, a human machine interface (HMI) 112, a global navigation satellite system (GNSS) controller 114, and sensors 116. The sensors 116 may allow the vehicle 102 to sense aspects of the environment 106 surrounding the vehicle 102. The TCU 108 may be configured to allow the vehicle 102 to communicate information with a RUC service provider cloud 118 and an original equipment manufacturer (OEM) cloud 120. The information may include RUC charge geometry rules 122 as well as a vehicle RUC charge 124 data. It should be noted that the system 100 shown in FIG. 1 is merely an example, and systems having more, fewer, and different arrangements of elements may be used. Moreover, while one vehicle 102 along one roadway 104 is shown, it is contemplated that systems 100 would include many vehicles 102 and roadways 104 to traverse.

The vehicles 102 may include various other types of passenger vehicles, such as sedans, crossover utility vehicles (CUVs), vans, sport utility vehicles (SUVs), trucks, recreational vehicles (RVs), scooters, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric powered by both an internal combustion engine and one or more electric motors, such as a series hybrid electric vehicle, a parallel hybrid electric vehicle, or a parallel/series hybrid electric vehicle. As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The roadway 104 may include various areas that may be traversed by the vehicle 102. In some examples, the roadway 104 may be a public road maintained by a municipality. Or the roadway 104 may be a private road that is not maintained by a municipality. In some cases, the roadway 104 may be paved, while in others the roadway 104 may be unpaved. The roadway 104 may include one or more lanes of travel. In some cases, the roadway 104 may be two-way, meaning travel is allowed in both directions, while in other cases the roadway 104 may be one-way, meaning travel is allowed only in a single direction. The roadway 104 may be surrounding by an environment 106. The environment 106 may include objects such as buildings, trees, animals. The environment 106 may also include other traffic participants such as other vehicles 102, pedestrians, etc. The environment 106 may further include traffic controls such as street signs and traffic lights.

The TCU 108 may be configured to provide telematics services to the vehicle 102. These services may include, as some non-limiting possibilities, navigation, turn-by-turn directions, vehicle health reports, local business search, accident reporting, and hands-free calling. The TCU 108 may accordingly be configured to communicate over various protocols, such as with a communications network over a network protocol (such as Uu). The TCU 108 may, additionally, be configured to communicate over a broadcast peer-to-peer protocol (such as PC5), to facilitate V2X communications with devices such as road-side units (RSUs) 110. It should be noted that these protocols are merely examples, and different peer-to-peer and/or cellular technologies may be used.

The HMI 112 may include various output devices configured to provide information to users, as well as input devices configured to receive information from users. Output devices may include, as some examples, display screens, touch screens, projectors, lights, speakers, buzzers, and haptic feedback transducers. Input devices may include, as some examples, touch screens, keyboards, buttons, knobs, and microphones, as some possibilities.

The GNSS controller 114 may be utilized by the vehicle 102 to provide autonomous geo-spatial positioning for the vehicle 102. As some examples, the GNSS controller 114 controller may allow the vehicle 102 to determine its position using one or more satellite navigation systems, such as global positioning system (GPS), GLONASS, Galileo, Beidou and/or others.

The sensors 116 may include various hardware devices configured to allow the vehicle 102 to sense aspects of the roadway 104 and the environment 106 surrounding the vehicle 102. Example sensors 116 may include still cameras, video cameras, light detection and ranging (LIDAR) sensors 116, radio detection and ranging (RADAR) sensors 116, sound navigation and ranging (SONAR) sensors 116, etc. The vehicle 102 may utilize the sensors 116 for various purposes, such as for driver assistance features, for semi-autonomous driving features, or for fully autonomous driving features.

The RUC service provider cloud 118 may include one or more networked computing devices configured to perform operations in support of the functionality of the system 100. In an example, the RUC service provider cloud 118 may be in communication with the vehicles 102 and the OEM cloud 120. The RUC service provider cloud 118 may be configured to perform payment reconciliation operations, reporting functions, and may also provide information regarding vehicles 102 that are observed on the roadway 104 that may not have paid (e.g., as identified by cameras or vehicle transmissions).

The OEM cloud 120 may also include one or more networked computing devices configured to perform operations in support of the functionality of the system 100. In an example, the OEM cloud 120 may be in communication with the vehicles 102 and the RUC service provider cloud 118. The OEM cloud 120 may include various private computing resources configured to provide services to the vehicle 102. In an example, the vehicle 102 may utilize the TCU 108 to connect to a network access point name (APN) for vehicle applications that utilize remote computing assistance. The OEM cloud 120 may connect to the RUC service provider cloud 118 through a gateway, providing secured access to other devices, such as the RUC service provider cloud 118.

The RUC charge geometry rules 122 may include information indicative of incurred charge for traversing segments of the roadway 104, including charges for usage of different lanes (e.g., express, carpool, regular, etc.), charges for usage for different classes of vehicles 102 (e.g., passenger cars, semi-trucks, etc.), charges for usage for different times of day, and charges for usage for high traffic vs low traffic situations. The RUC charge geometry rules 122 may further include information with respect to differences in charges for private roads, dirt roads, or other roadways 104 which may incur a charge differently or not at all as compared to public roadways 104. The vehicle 102 may receive the RUC charge geometry rules 122 from the RUC service provider cloud 118, either directly or in other examples via the OEM cloud 120.

Figure 2:
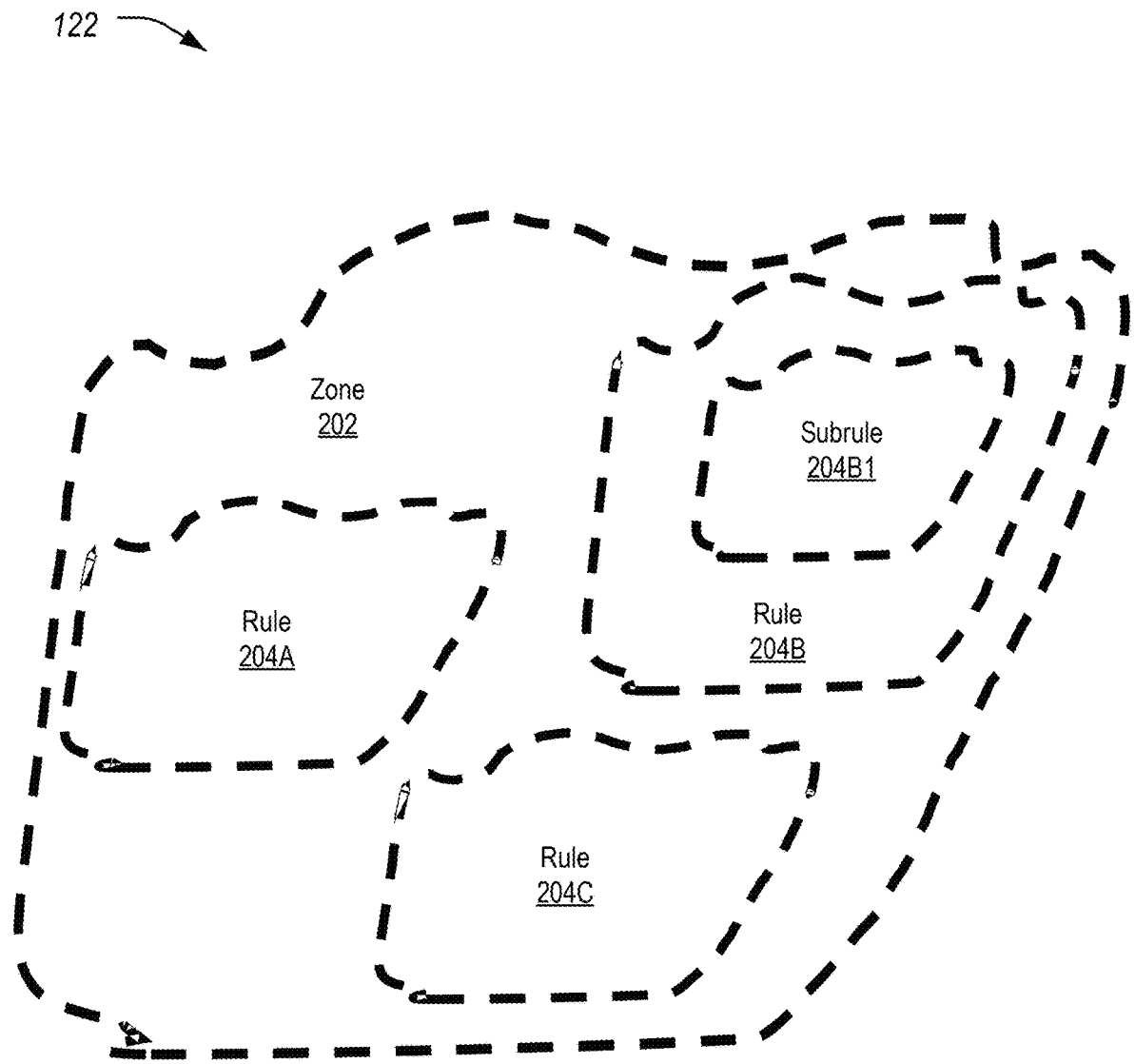
FIG. 2 illustrates an example of a zone for which charging rules are defined.

Referring to FIG. 2, an example hierarchy of RUC charge geometry rules 122 is shown. The RUC charge geometry rules 122 as shown define the charges for roadway 104 usage in a geographical area, here referred to as a zone 202. The zone 202 may be defined in the RUC charge geometry rules 122 as a specification of a geographic boundary, such as via a contour of latitude and longitude coordinates. In one example, the RUC charge geometry rules 122 may be sent to the vehicle 102 responsive to detection by the system 100 that the vehicle 102 has entered a geography in which RUC is being performed.

Within the zone 202, there may be base rules that generally apply, such as charges that are generally incurred per distance traveled. However, there may be subareas of the zone 202 in which different charges may apply for roadway 104 usage. These differences in how charges are applied may be specified as one or more rules 204 that override the defaults specified for the zone 202. For instance, a municipality may charge an additional tariff for travel within its boundaries, which may be incurred in addition to the charges within the overall zone 202. As shown, a first rule 204A applies for a portion of the zone 202, a second rule 204B applies for a second portion of the zone 202, and a third rule 204C applies for a third portion of the zone 202.

The rules 204 may form a hierarchy, where rules 204 may be defined to override other rules 204, in addition to how the rules 204 may override the defaults of the zone 202. For instance, a rule 204B1 may be defined to override how charges are applied within the area defined by the second rule 204B. Accordingly, a hierarchy of rules 204 may be provided to define the charging rules 204 that apply across the zone 202.

Referring back to FIG. 1, the vehicle RUC charge 124 may include information to allow for the vehicle 102 to be charged. This may include, for example, an account identifier to be charged the amount owed for the reporting period detailed by the vehicle RUC charge 124. The account identifier may identify, as some examples, an account of the occupant corresponding to the vehicle 102 and/or an account of an occupant of the vehicle 102. The vehicle RUC charge 124 may also include other information, such as a total distance traveled and/or a distance traveled per charger domain.

The vehicle 102 may send the vehicle RUC charge 124 to the RUC service provider cloud 118, either directly or in other examples via the OEM cloud 120. Based on the vehicle RUC charge 124, the RUC service provider cloud 118 may charge the vehicle 102 and may provide funding to the different municipalities corresponding to the fees incurred in each charging domain.

Figure 3:
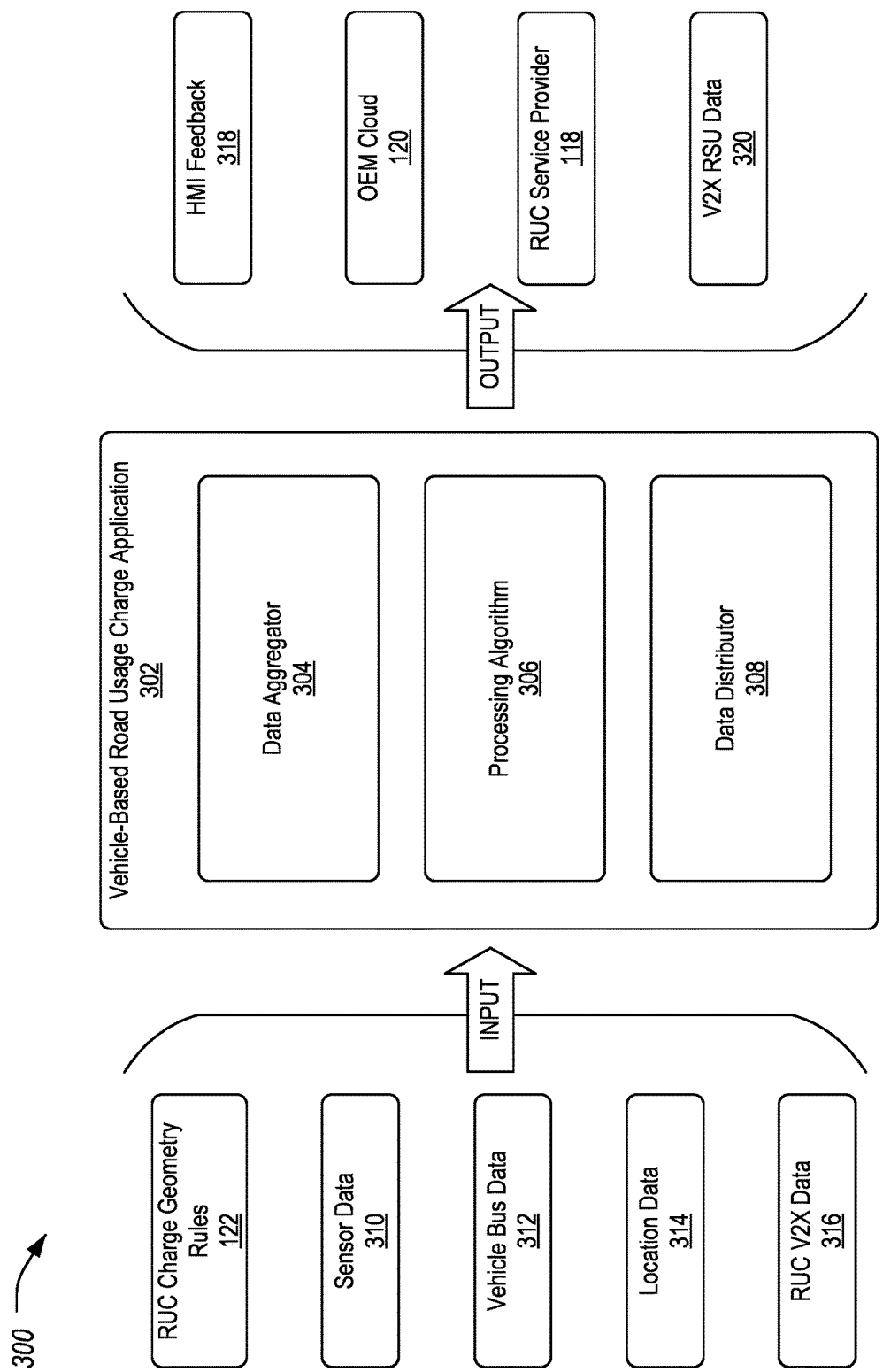
FIG. 3 illustrates aspects of a vehicle-based road usage charge application that is executed by the vehicle.

FIG. 3 illustrates aspects 300 of a vehicle-based road usage charge application 302 that is executed by the vehicle 102. With reference to FIG. 3, and with continuing reference to FIG. 1, the vehicle-based road usage charge application 302 may be programmed to allow the vehicle 102 to perform various RUC operations discussed in detail herein. The vehicle-based road usage charge application 302 may include a data aggregator 304 configured to receive various inputs from one or more components, a processing algorithm 306 configured to operate on the received inputs, and a data distributor 308 configured to provide outputs to one or more components. In an example, the vehicle-based road usage charge application 302 may be executed by one or more processors of the TCU 108.

The data aggregator 304 of the vehicle-based road usage charge application 302 may receive various elements of data as input. In an example, these inputs may include the RUC charge geometry rules 122 (as mentioned above), sensor data 310 from the sensors 116, vehicle bus data 312 from a controller area network (CAN) or other data bus of the vehicle 102, location data 314 from the GNSS controller 114, and RUC V2X data 316 from RSUs 110. This information may be provided to the processing algorithm 306, as discussed in detail herein.

The data distributor 308 of the vehicle-based road usage charge application 302 may provide various outputs as well. In an example, these outputs may include HMI feedback 318 provided to the HMI 112 for use by occupants of the vehicle 102, vehicle RUC charge 124 information output to the OEM cloud 120 and/or to the RUC service provider cloud 118, as well as V2X RSU data 320 for receipt by RSUs 110. These outputs may be received from the processing algorithm 306, as discussed in detail herein.

Figure 4:
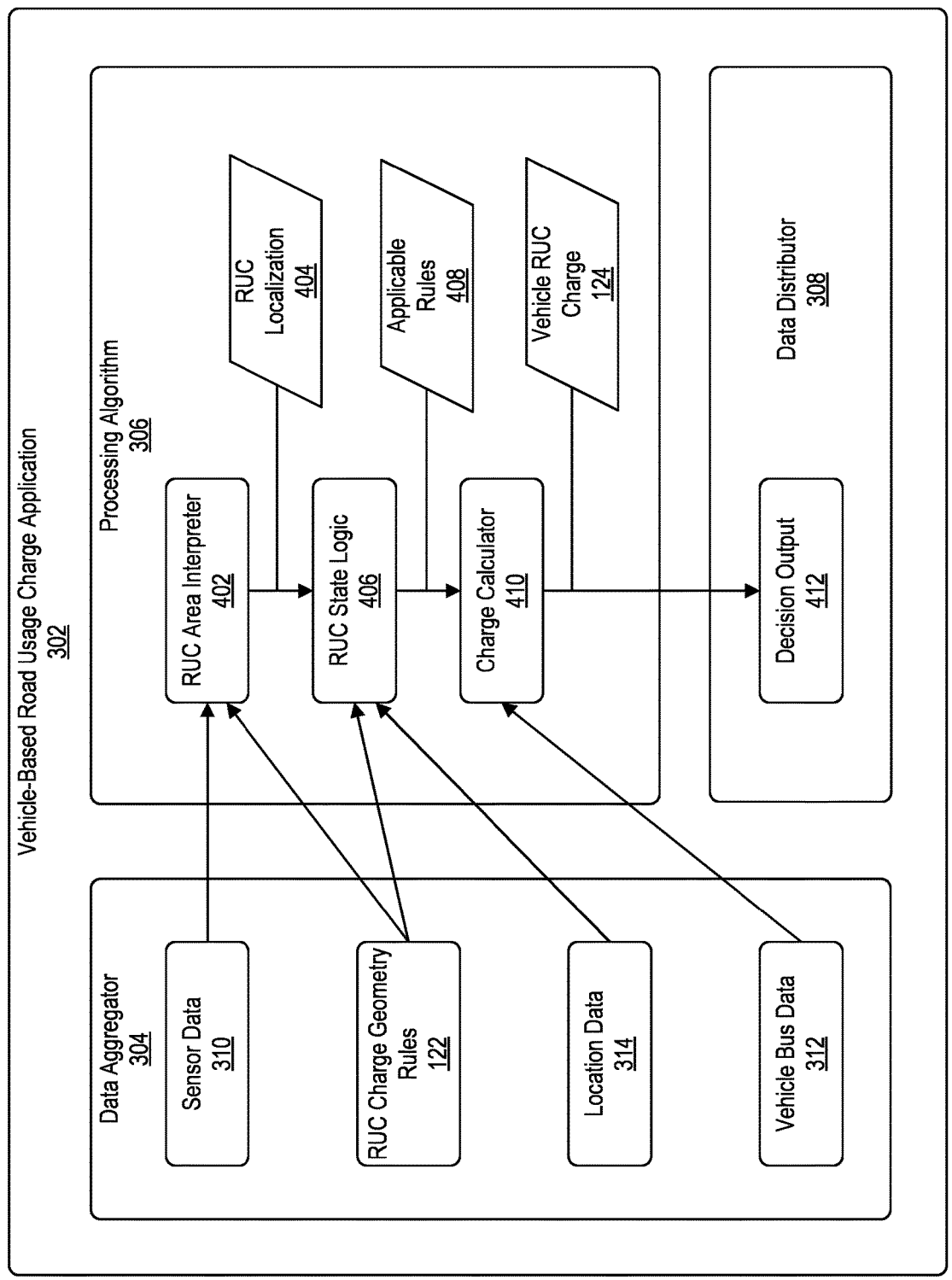
FIG. 4 illustrates further details of the operation of the vehicle-based road usage charge application.

FIG. 4 illustrates further details of the operation of the vehicle-based road usage charge application 302. As shown, the processing algorithm 306 may include a RUC area interpreter 402. The RUC area interpreter 402 may receive the sensor data 310 as well as the RUC charge geometry rules 122 from the data aggregator 304 and may generate a RUC localization 404. The RUC localization 404 may indicate, based on the sensor data 310, details of the environment 106 that may be used to determine the type of roadway 104 being traversed by the vehicle 102. Significantly, the determination of the type of roadway 104 may be performed without the use of HD maps. Further aspects of the operation of the RUC area interpreter 402 are discussed with respect to FIG. 5.

The processing algorithm 306 may also include RUC state logic 406. The RUC state logic 406 may receive the RUC localization 404 as well as the RUC charge geometry rules 122 and the location data 314 and may identify applicable rules 408 from the RUC charge geometry rules 122. For instance, the RUC charge geometry rules 122 may include rules 204 for one or more zones 202, and the processing algorithm 306 may determine, based on the location data 314, which zones 202 and/or rules 204 are applicable for the current location of the vehicle 102. Based on the identified applicable rules 408, the RUC state logic 406 may utilize a state machine to determine the charge. Further aspects of the state machine are illustrated below with respect to FIG. 10.

The processing algorithm 306 may also include a charge calculator 410, which may receive the vehicle bus data 312 and the applicable rules 408 from the RUC state logic 406, to provide a decision output 412 to the data distributor 308 including the vehicle RUC charge 124. In an example, the vehicle bus data 312 may be used to identify the distance being traveled by the vehicle 102, and/or the duration of time of the travel of the vehicle 102. This information may be used, in combination with the applicable rules 408, to compute the vehicle RUC charge 124.

The vehicle RUC charge 124 may be included in the decision output 412 provided by the charge calculator 410 to the data distributor 308. In turn, the data distributor 308 may determine what devices are to be informed of the vehicle RUC charge 124. In an example, the data distributor 308 may provide the decision output 412 may be provided to the HMI 112 to provide HMI feedback 318 indicative of the amount of the vehicle RUC charge 124. In an example, the data distributor 308 may provide the decision output 412 to the TCU 108 to inform the RUC service provider cloud 118 and/or the OEM cloud 120 of the vehicle RUC charge 124. In examples where the vehicle 102 is in communication with infrastructure via a RSU 110, the data distributor 308 may provide the decision output 412 to the RSU 110 to allow the infrastructure to be informed of the vehicle RUC charge 124.

Figure 5:
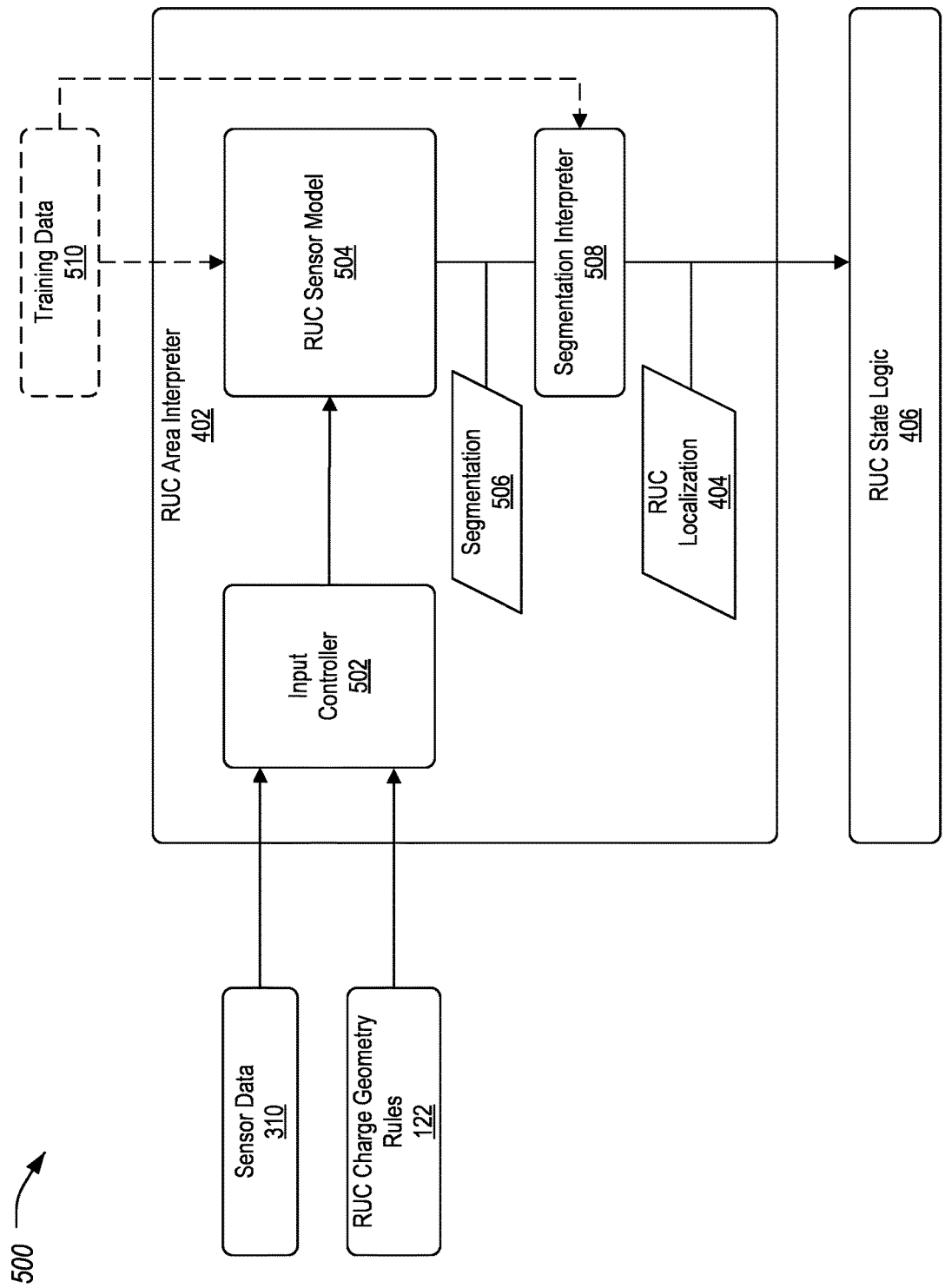
FIG. 5 illustrates further details of the operation of the RUC area interpreter.

FIG. 5 illustrates further details 500 of the operation of the RUC area interpreter 402. As noted in the discussion of FIG. 4, the RUC area interpreter 402 may receive the sensor data 310 and the RUC charge geometry rules 122. These inputs may be received to an input controller 502 of the RUC area interpreter 402. For instance, the input controller 502 may receive sensor data 310 including one or more of video streams from camera sensors 116, LiDAR data from LiDAR sensors 116, RADAR data from RADAR sensors 116, SONAR data from SONAR sensors 116, etc., and may buffer or otherwise preprocess that data to allow the data to be provided to a RUC sensor model 504 for evaluation.

The RUC sensor model 504 may include one or more machine learning models that are trained based on training data 510 to output the RUC localization 404 indicative of the type of roadway 104 being traversed by the vehicle 102 (or separate likelihoods that the vehicle 102 is traversing each of a set of types of roadway 104).

In an example, the RUC sensor model 504 may perform semantic segmentation based on the received sensor data 310. The output of the semantic segmentation may be a segmentation 506 including a sematic labeling of the different elements in the sensor data 310. Semantic segmentation refers to a pixel level image classification in which pixels of the sensor data 310 are clustered together into one of a set of class labels. These labels could include, for example, vehicle 102, human, building, roadway 104, tree, traffic control, etc. Using the input, the RUC sensor model 504 may perform a mapping of pixels of the sensor data 310 to categories. In an example, the RUC sensor model 504 for performing the semantic segmentation may be a deep convolutional neural network. In some examples, the segmentation 506 may be performed per frame. In other examples, the segmentation 506 may be performed across frames, such as to identify motion (e.g., animals, pedestrians, etc.) over several image frames.

Based on the detected objects, a segmentation interpreter 508 may determine the type of roadway 104 that is being traversed by the vehicle 102. For instance, if a quantity and/or total area of pixels of the segmentation 506 are labeled as being objects of an environment 106 that is consistent with a public roadway 104, then the RUC area interpreter 402 may determine that the vehicle 102 is traversing a public roadway 104. In another example, if a quantity and/or total area of pixels of the segmentation 506 are detected as being objects of an environment 106 that is consistent with a private roadway 104, then the RUC area interpreter 402 may determine that the vehicle 102 is traversing a private roadway 104.

The segmentation interpreter 508 may accordingly generate a RUC localization 404 indicative of which type of roadway 104 the vehicle 102 is determined to mostly likely be traversing. Or, in another example, the RUC localization 404 may include probabilities for each possible type of roadway 104, such as a probability that the vehicle 102 is traversing a public roadway 104, a private roadway 104, etc. are all indicated. In many cases where multiple probabilities are included, the sum of the included probabilities may add up to 100%. As noted above, the RUC localization 404 may be provided to the RUC state logic 406 for further processing.

Figure 6:
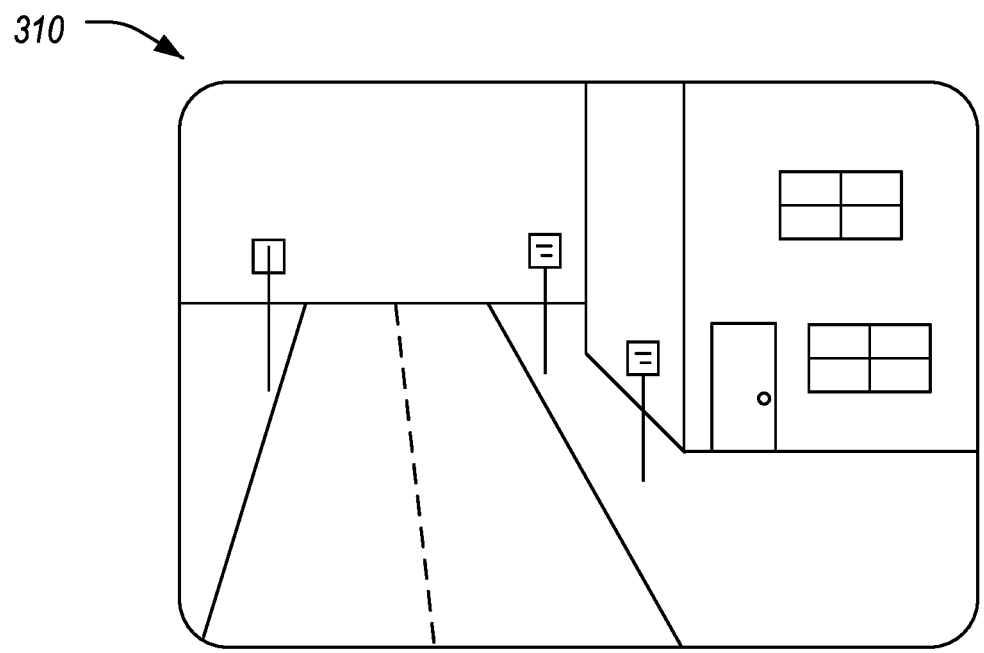
FIG. 6 illustrates an example of image sensor data captured by the sensors of the vehicle traversing a public roadway.

FIG. 6 illustrates an example of image sensor data 310 captured by the sensors 116 of the vehicle 102 traversing a public roadway 104. As shown, the sensor data 310 includes a paved roadway 104 having lane markers, a building, and several street signs.

Figure 7:
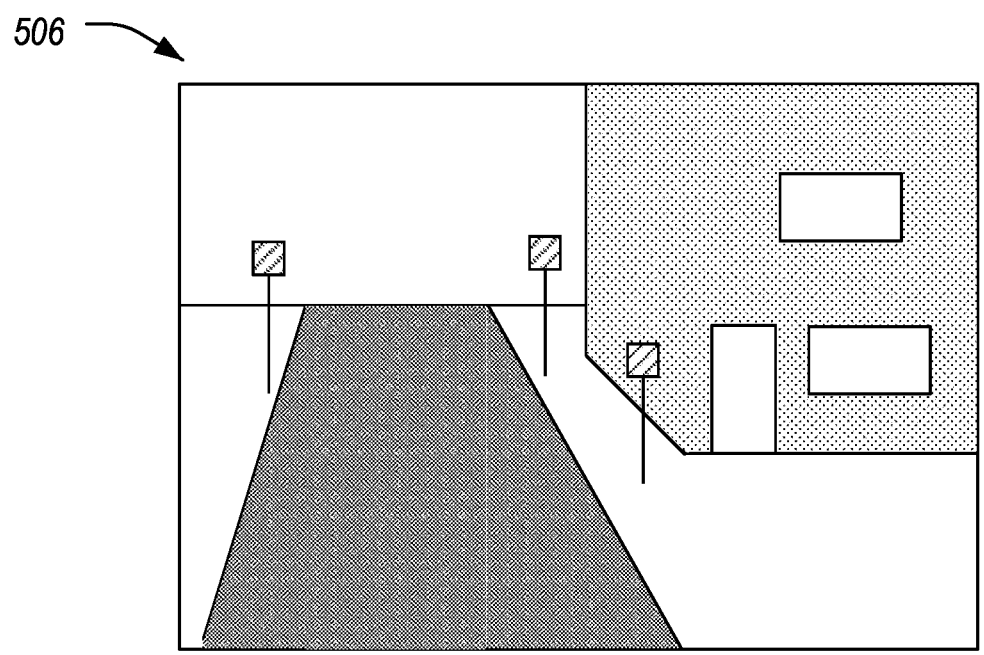
FIG. 7 illustrates an example of a semantic segmentation of the captured sensor data shown in FIG. 6.

FIG. 7 illustrates an example semantic segmentation 506 of the captured sensor data 310 shown in FIG. 6. As shown, the semantic segmentation 506 includes a detection of the traffic controls, indicated by the diagonal line pattern. Also, the semantic segmentation 506 includes a detection of the building, indicated by the light dotted pattern. The semantic segmentation 506 also includes a detection of the paved roadway 104, as indicated by the dark dotted pattern. The detection of these features may be utilized by the segmentation interpreter 508 to infer that the vehicle 102 is traveling along a public roadway 104.

Figure 8:
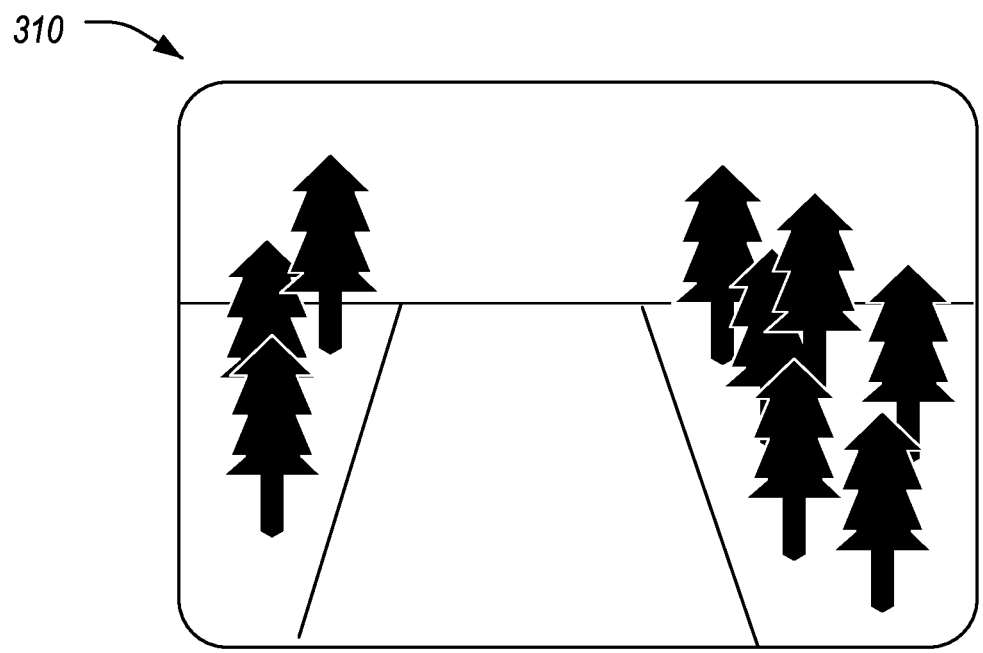
FIG. 8 illustrates an example of image sensor data captured by the sensors of the vehicle traversing a private roadway.

FIG. 8 illustrates an alternate example of image sensor data 310 captured by the sensors 116 of the vehicle 102 traversing a private roadway 104. As shown, the sensor data 310 here includes an unpaved roadway 104 lacking lane markers and many trees.

Figure 9:
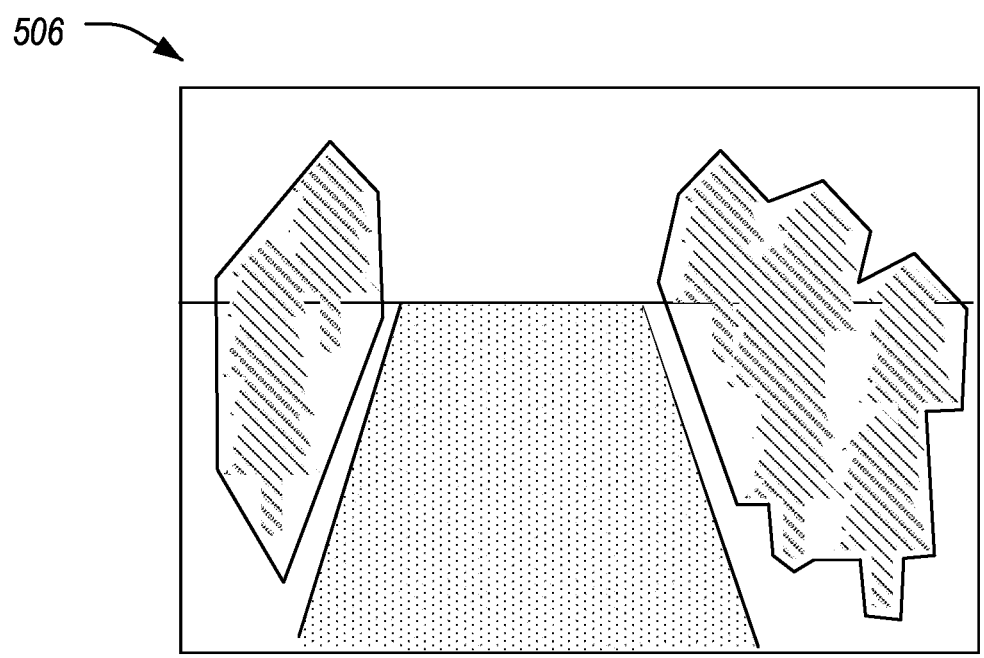
FIG. 9 illustrates an example of a semantic segmentation of the captured sensor data shown in FIG. 8.

FIG. 9 illustrates an example semantic segmentation 506 of the captured sensor data 310 shown in FIG. 8. As shown, the semantic segmentation 506 includes a detection of the trees, indicated by the diagonal line pattern. The semantic segmentation 506 also includes a detection of the unpaved roadway 104, as indicated by the light dotted pattern. The detection of these features may be utilized by the segmentation interpreter 508 to infer that the vehicle 102 is traveling along a private roadway 104.

Figure 10:
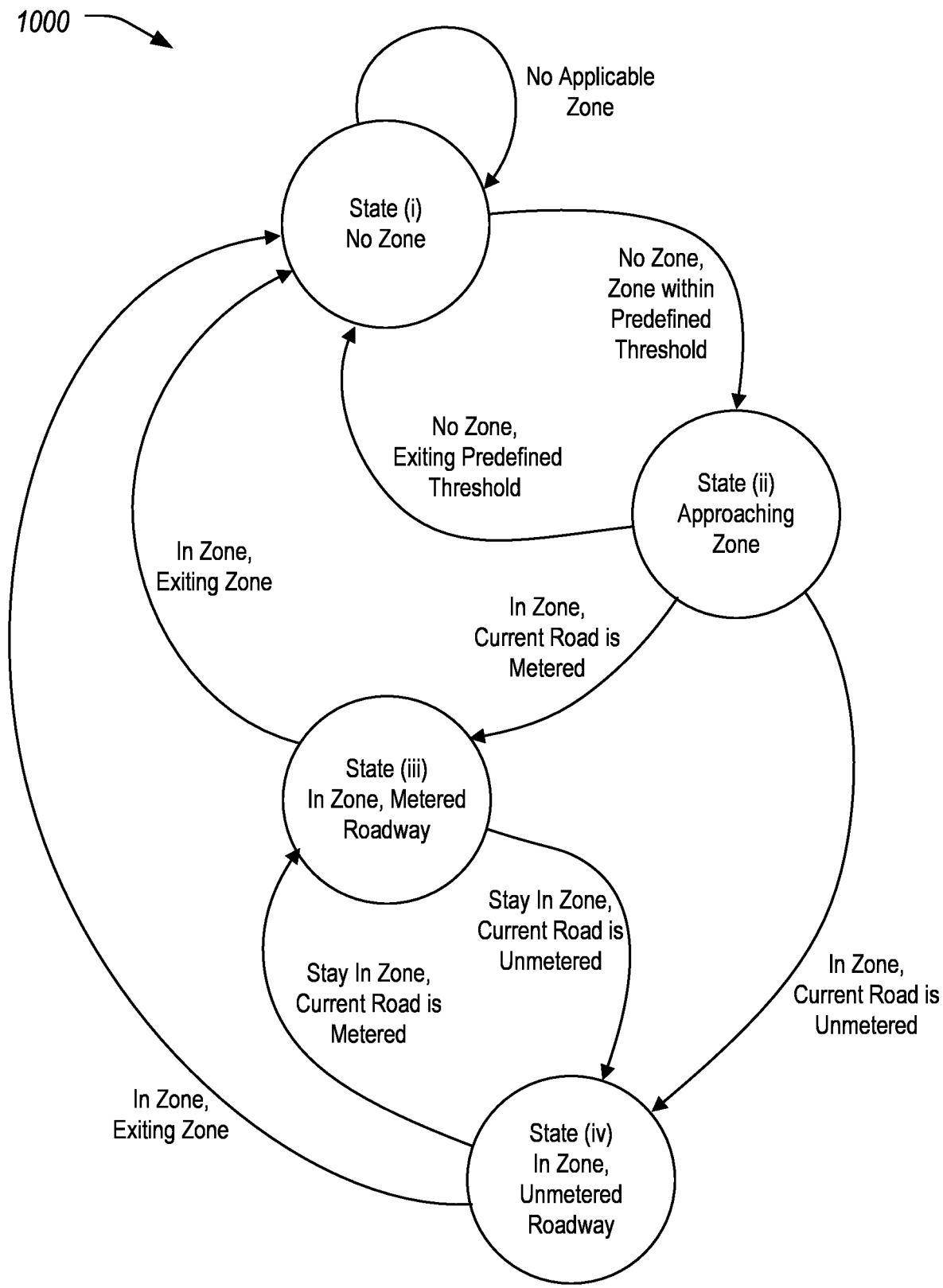
FIG. 10 illustrates an example state machine for the performance of the RUC computations by the RUC state logic informed by the RUC localization.

FIG. 10 illustrates an example state machine 1000 for the performance of the V2X road usage computations performed by the RUC state logic 406 informed by the RUC localization 404. As shown, the state machine 1000 includes four main states: (i) travel of the vehicle 102 outside the zone 202; (ii) approach of the vehicle 102 to the zone 202 for which applicable rules 408 are in force; (iii) travel of the vehicle 102 along a public roadway 104 in the area governed by the applicable rules 408 of the zone 202; and (iv) travel of the vehicle 102 along a private roadway 104 in the area governed by the applicable rules 408 of the zone 202.

In state (i), the vehicle 102 may remain in state (i) responsive to the vehicle 102 traveling outside the zone 202. For instance, this may occur if the vehicle 102 is traveling in an area in which no municipalities are charging for roadway 104 usage.

The vehicle 102 may transition from state (i) into state (ii) responsive to the vehicle 102 moving to within a predefined threshold of the zone 202 area defined by rules 204 in the RUC charge geometry rules 122. This predefined threshold may be a distance threshold to the zone 202 in an example, or may be a travel time threshold to the zone 202 in another example. For instance, the vehicle 102 may be traversing an area of roadway 104 that connects to an area of roadway 104 within the zone 202 according to the information in the RUC charge geometry rules 122.

From state (ii), the vehicle 102 may transition into state (i) responsive to the vehicle 102 changing paths to move away from the zone 202 as defined by the RUC charge geometry rules 122. This may occur, for instance, if the vehicle 102 elects not to enter the zone 202. For instance, the transition to state (ii) may cause the data distributor 308 to display HMI feedback 318 in the HMI 112 informing the user that the area being entered is a RUC zone 202, and the user may elect to choose another route.

The vehicle 102 may transition from state (ii) to state (iii) responsive to the vehicle 102 crossing over into the zone 202 and onto a metered road (e.g., a public roadway 104) in the zone 202. In state (iii), the vehicle 102 accrues RUC charges according to the information specified in the applicable rules 408 of the RUC charge geometry rules 122. This toll charge may be determined according to factors and charge amounts specified in the applicable rules 408, such as the make, model, class, time of day, number of occupants, distance traveled, etc. of the vehicle 102.

The vehicle 102 may also transition from state (ii) to state (iv) responsive to the vehicle 102 crossing over into the zone 202 onto an unmetered road (e.g., a private roadway 104) within the zone 202. Whether the roadway 104 in the zone 202 is metered or not may be identified by the RUC area interpreter 402, in an example, according to the segmentation of sensor data 310 and identification of features as discussed above. Significantly, the determination of whether the roadway 104 is metered or unmetered may be determined without the use of HD maps.

It should also be noted that the vehicle 102 may transition from state (iv) to state (iii) responsive to the vehicle 102 remaining in the zone 202 and entering a metered roadway 104 in the zone 202, as well as from state (iii) to state (iv) responsive to the vehicle 102 remaining in the zone 202 and entering an unmetered roadway 104 in the zone 202.

From either states (iii) or (iv), responsive to the vehicle 102 exiting the zone 202, the vehicle 102 may transition to state (i). In some examples, the vehicle 102 may send the vehicle RUC charge 124 responsive to transitioning out of the zone 202. Additionally or alternatively, the vehicle 102 may send vehicle RUC charge 124 messages periodically while in the zone 202 to allow the system 100 to keep track of the vehicle 102 usage as the vehicle 102 traverses within the zone 202.

Figure 11:
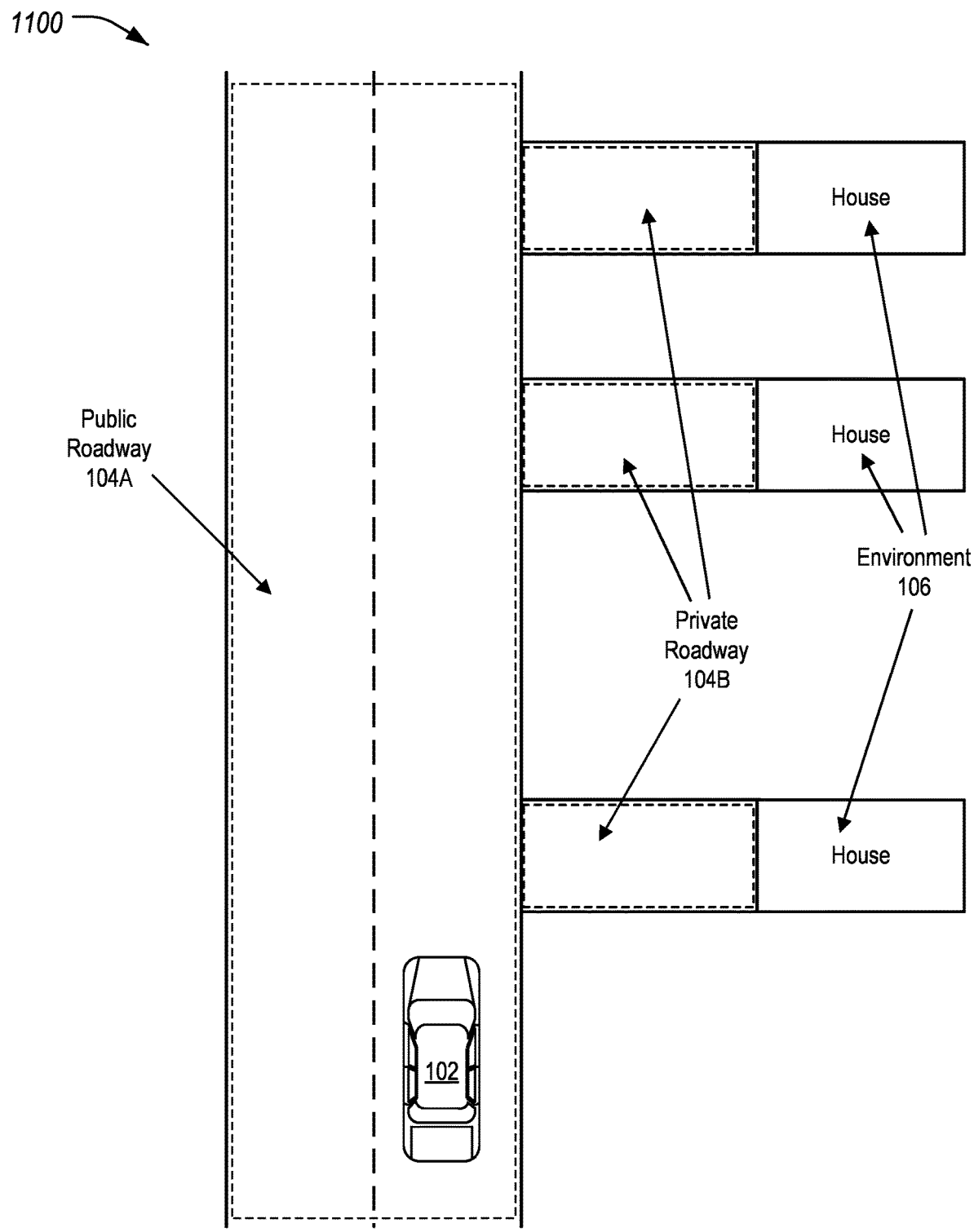
FIG. 11 illustrates an example of use of the vehicle-based road usage charge application in determining the vehicle RUC charge due by the vehicle at the roadway type level.

FIG. 11 illustrates an example 1100 of use of the vehicle-based road usage charge application 302 in determining the vehicle RUC charge 124 due by the vehicle 102 at the roadway type level. As shown, the vehicle 102 has determined that a first portion of the roadway 104 is public roadway 104A, and second portions of the roadway 104 are private roadways 104B. This determination may be made by the RUC area interpreter 402 based on the sensor data 310 captured by the vehicle 102. Based on the determination, the RUC state logic 406 may cause the vehicle 102 to accumulate vehicle RUC charge 124 for traversal of the public roadway 104A, but not for traversal of the private roadway 104B.

Figure 12:
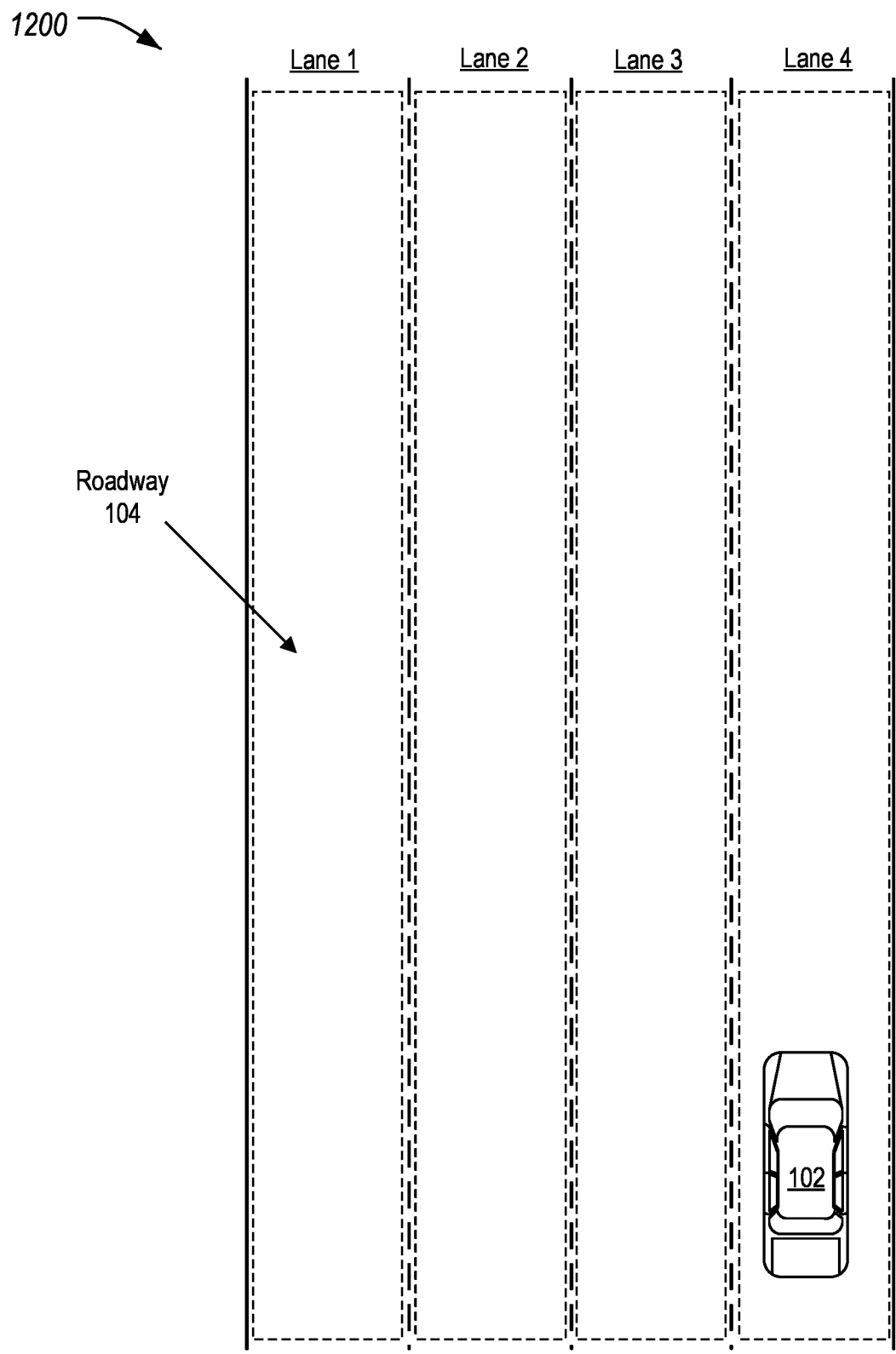
FIG. 12 illustrates an example of use of the vehicle-based road usage charge application in determining the vehicle RUC charge due by the vehicle at the lane level.

FIG. 12 illustrates an example 1200 of use of the vehicle-based road usage charge application 302 in determining the vehicle RUC charge 124 due by the vehicle 102 at the lane level. As shown, the vehicle 102 has determined that the roadway 104 is public roadway 104 having four lanes. This determination may also be made by the RUC area interpreter 402 based on a semantic segmentation 506 of the sensor data 310 captured by the vehicle 102. Based on the determination, the RUC state logic 406 may cause the vehicle 102 to accumulate vehicle RUC charge 124 according to the RUC charge geometry rules 122 for traversal of the lane of the roadway 104 that the vehicle 102 is in.

Figure 13:
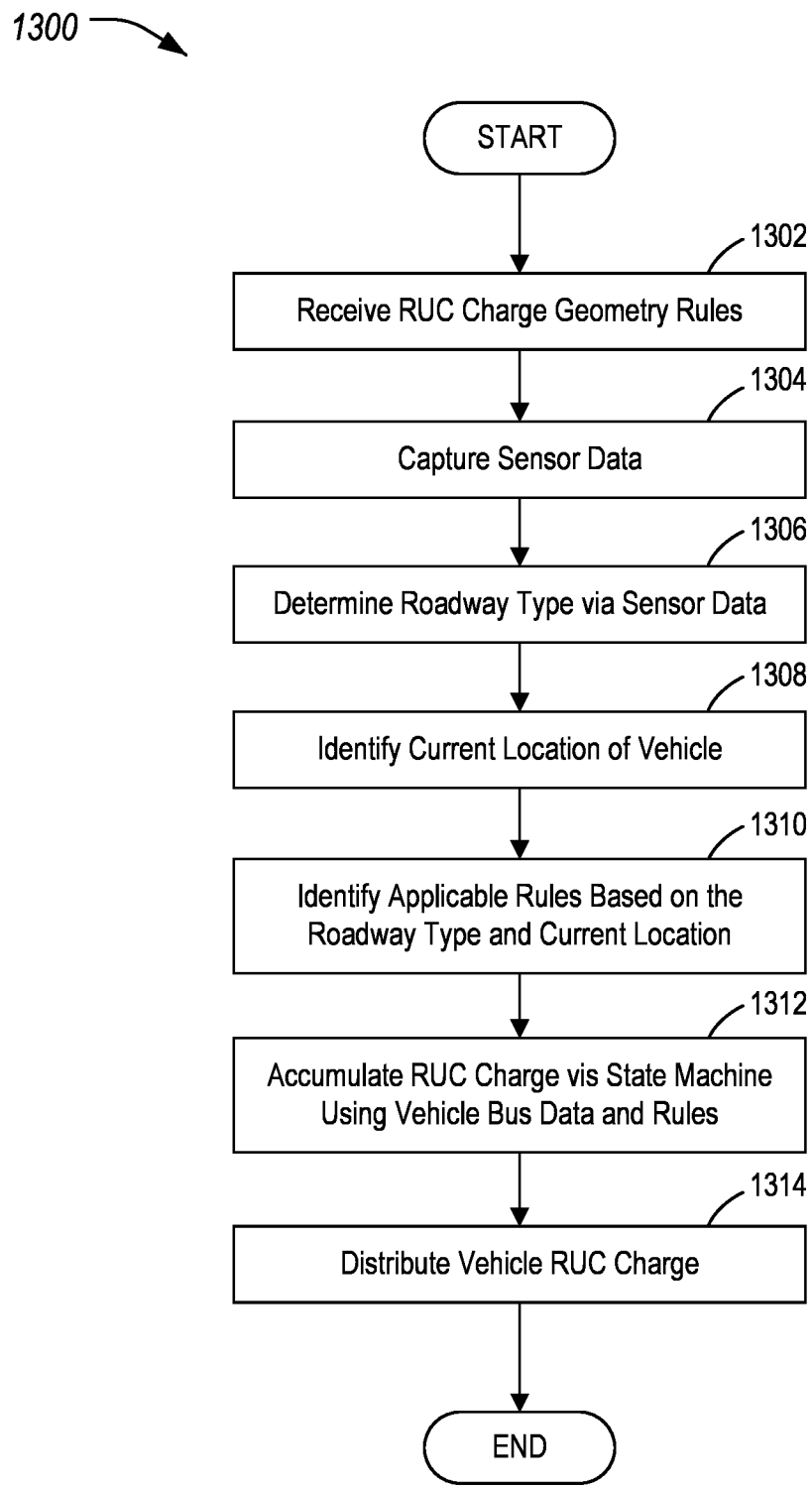
FIG. 13 illustrate an example process for the operation of the vehicle-based road usage charge application.

FIG. 13 illustrate an example process 1300 for the operation of the vehicle-based road usage charge application 302, the performance of vehicle-based road usage determination without dependence on HD road maps. In an example, the process 1300 may be performed by components of the vehicle-based road usage charge application 302 executed by the TCU 108 of the vehicle 102 in the context of the system 100.

At operation 1302, the vehicle 102 receives RUC charge geometry rules 122. The RUC charge geometry rules 122 may be received to the TCU 108 via various paths. In an example, the RUC charge geometry rules 122 may be received to the vehicle 102 from a RSU 110 along the roadway 104. In another example, the RUC charge geometry rule 122 may be received to the vehicle 102 from the RUC service provider cloud 118, e.g., via a communications network. In yet another example, the RUC charge geometry rules 122 may be received to the vehicle 102 via the OEM cloud 120, e.g., via an APN connection through the OEM cloud 120 to provide secure communication to the RUC service provider cloud 118.

The RUC charge geometry rules 122 may include information indicative of incurred charge for traversing segments of the roadway 104, including charges for usage of different lanes (e.g., express, carpool, regular, etc.), charges for usage for different classes of vehicles 102 (e.g., passenger cars, semi-trucks, etc.), charges for usage for different times of day, and charges for usage for high traffic vs low traffic situations. The RUC charge geometry rules 122 may further include information with respect to differences in charges for private roads, dirt roads, or other roadways 104 which may incur a charge differently or not at all as compared to public roadways 104. An example hierarchy of RUC charge geometry rules 122 is shown in FIG. 2.

At operation 1304, the vehicle 102 captures sensor data 310. In an example, the vehicle 102 may include sensors 116 for various purposes, such as for driver assistance features, for semi-autonomous driving features, or for fully autonomous driving features. These sensors 116 may be configured to sense aspects of the roadway 104 and the environment 106 surrounding the vehicle 102. Example sensors 116 may include still cameras, video cameras, LIDAR sensors 116, RADAR sensors 116, SONAR sensors 116, etc. For instance, the input controller 502 may receive sensor data 310 including one or more of video streams from camera sensors 116, LiDAR data from LiDAR sensors 116, RADAR data from RADAR sensors 116, SONAR data from SONAR sensors 116, etc., and may buffer or otherwise preprocess that data to allow the data to be provided to a RUC sensor model 504 for evaluation. Examples of the sensor data 310 are discussed above with respect to FIGS. 6 and 8.

At operation 1306, the vehicle 102 determines the roadway 104 type based on the sensor data 310. In an example, the RUC sensor model 504 may perform semantic segmentation based on the received sensor data 310. The output of the semantic segmentation may be a segmentation 506 including a sematic labeling of the different elements in the sensor data 310. Based on the detected objects, the segmentation interpreter 508 may determine the type of roadway 104 that is being traversed by the vehicle 102. For instance, if a quantity and/or total area of pixels of the segmentation 506 are labeled as being objects of an environment 106 that is consistent with a public roadway 104, then the RUC area interpreter 402 may determine that the vehicle 102 is traversing a public roadway 104. In another example, if a quantity and/or total area of pixels of the segmentation 506 are detected as being objects of an environment 106 that is consistent with a private roadway 104, then the RUC area interpreter 402 may determine that the vehicle 102 is traversing a private roadway 104. Examples of the segmentation 506 are discussed above with respect to FIGS. 7 and 9.

At operation 1308, the vehicle 102 identifies the current location of the vehicle 102. In an example, the vehicle-based road usage charge application 302 may receive the location data 314 indicative of the location of the vehicle 102 from the GNSS controller 114, e.g., as vehicle bus data 312.

At operation 1310, the vehicle 102 identifies the applicable rules 408 for the location data 314. In an example, the RUC state logic 406 may receive the RUC localization 404 as well as the RUC charge geometry rules 122 and the location data 314 and may identify the applicable rules 408 from the RUC charge geometry rules 122. For instance, the RUC charge geometry rules 122 may include rules 204 for one or more zones 202, and the processing algorithm 306 may determine, based on the location data 314, which zones 202 and/or rules 204 are applicable for the current location of the vehicle 102.

At operation 1312, the RUC state logic 406 of the vehicle 102 utilize the state machine 1000 to accumulate RUC of the vehicle 102. The accumulation may be performed according to the applicable rules 408 of the zone 202 and the current position of the vehicle 102 determined via the location data 314. Further aspects of the operation of the state machine 1000 are discussed in detail with respect to FIG. 10.

At operation 1314, the vehicle 102 distributes vehicle RUC charge 124 results. In an example, the vehicle-based road usage charge application 302 may provide an alert to the user as HMI feedback 318 via the HMI 112. The alert may indicate, for instance, information indicative of an upcoming zone 202 such as a distance or time from the zone 202. The HMI feedback 318 may also include information with respect to the current vehicle RUC charge 124, such as the RUC charge being incurred, and/or the location of the vehicle 102 determined via the location data 314. The HMI feedback 318 may also include information indicative of a finalized RUC charge, such as an indication of exit of the vehicle 102 from the zone 202 or a completion of a trip and finalized current vehicle RUC charge 124 for the trip.

In another example, the TCU 108 the vehicle 102 may send a vehicle RUC charge 124. This vehicle RUC charge 124 may be received by an RSU 110 along the roadway 104, by a RUC service provider cloud 118, and/or by a OEM cloud 120 in communication with the RUC service provider cloud 118. The vehicle RUC charge 124 may also include a charge amount for the travel in the zone 202 as determined by the vehicle 102 using the information in the vehicle RUC charge 124. Other information may also be included in the vehicle RUC charge 124, such as the distance traveled by the vehicle 102, a number of passengers in the vehicle 102, and a license plate number or other identifier of the vehicle 102. After operation 1314, the process 1300 ends.

Thus, an enhanced vehicle-based RUC system 100 may utilize machine learning in the place of HD maps to describe the locations of drivable roads within an area. The vehicle 102 may utilize a vehicle-based road usage charge application 302 to receive RUC charge geometry rules 122 defining a zone 202 in which RUC are charged. The vehicle-based road usage charge application 302 may determine a roadway 104 type based on captured sensor data 310 indicative of the surroundings of the vehicle 102. For instance, the application may use machine learning models to output a RUC localization 404 indicative of the type of roadway 104 being traversed by the vehicle 102. Based on the roadway 104 type, the vehicle-based road usage charge application 302 may identify applicable rules 408 of the RUC charge geometry rules 122 according to a current location of the vehicle 102, the applicable rules 408 specifying how tariffs are computed for the determined roadway 104 type. The vehicle 102 may accumulate vehicle RUC charge 124 using vehicle bus data 312 indicative of progress of the vehicle 102 within the zone 202 and the determined roadway 104 type, for example 1100 using state machine 1000 logic. The application may use the vehicle RUC charge 124 for various purposes, such as the charging of the vehicle 102 for the road usage, as well as informing the vehicle 102 occupants of the charge.

While an exemplary modularization of the vehicle-based road usage charge application 302 is described herein, it should be noted that components of the vehicle-based road usage charge application 302 may be incorporated into fewer components or may be combined in fewer components or even into a single component. For instance, while each of the data aggregator 304, processing algorithm 306, data distributor 308, RUC area interpreter 402, RUC state logic 406, and charge calculator 410 described separately, these components may be implemented separately or in combination by one or more controllers in hardware and/or a combination of software and hardware.

Figure 14:
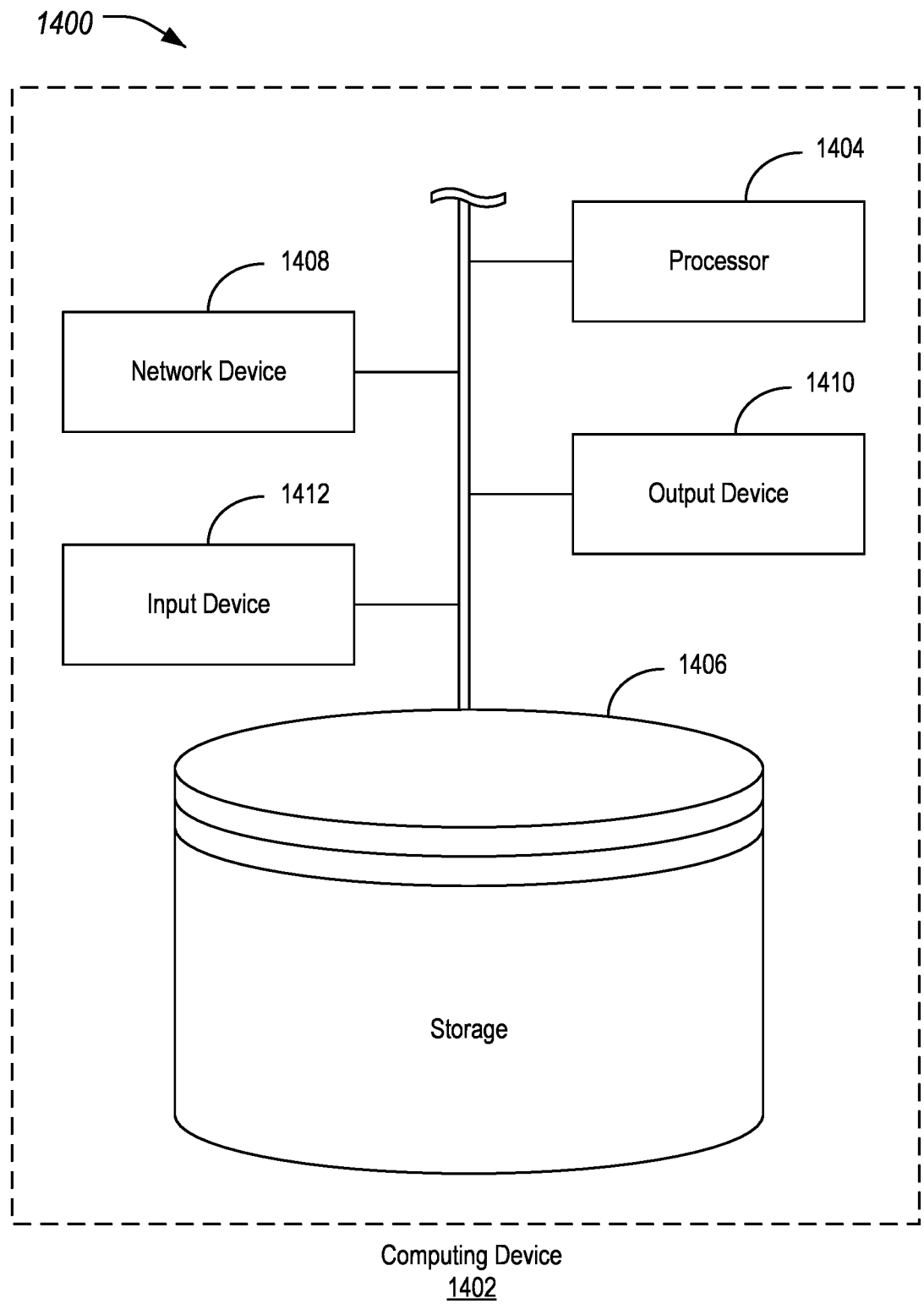
FIG. 14 illustrates an example of a computing device for use in the performance of vehicle-centric road usage determination without dependence on HD road maps.

FIG. 14 illustrates an example 1400 of a computing device 1402 for use in the performance of vehicle-centric road usage determination without dependence on HD road maps. Referring to FIG. 14, and with reference to FIGS. 1-13, the vehicle 102, TCU 108, RSUs 110, HMI 112, GNSS controller 114, sensors 116, RUC service provider cloud 118, and OEM cloud 120 may be examples of such computing devices 1402. As shown, the computing device 1402 may include a processor 1404 that is operatively connected to a storage 1406, a network device 1408, an output device 1410, and an input device 1412. It should be noted that this is merely an example, and computing devices 1402 with more, fewer, or different components may be used.

The processor 1404 may include one or more integrated circuits that implement the functionality of a central processing unit (CPU) and/or graphics processing unit (GPU). In some examples, the processors 1404 are a system on a chip (SoC) that integrates the functionality of the CPU and GPU. The SoC may optionally include other components such as, for example, the storage 1406 and the network device 1408 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 1404 executes stored program instructions that are retrieved from the storage 1406. The stored program instructions, accordingly, include software that controls the operation of the processors 1404 to perform the operations described herein. The storage 1406 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory includes static and dynamic random-access memory (RAM) that stores program instructions and data during operation of the enhanced vehicle-based RUC system 100.

The GPU may include hardware and software for display of at least two-dimensional (2D) and optionally three-dimensional (3D) graphics to the output device 1410. The output device 1410 may include a graphical or visual display device, such as an electronic display screen, projector, printer, or any other suitable device that reproduces a graphical display. As another example, the output device 1410 may include an audio device, such as a loudspeaker or headphone. As yet a further example, the output device 1410 may include a tactile device, such as a mechanically raisable device that may, in an example, be configured to display braille or another physical output that may be touched to provide information to a user.

The input device 1412 may include any of various devices that enable the computing device 1402 to receive control input from users. Examples of suitable input devices that receive human interface inputs may include keyboards, mice, trackballs, touchscreens, voice input devices, graphics tablets, and the like.

The network devices 1408 may each include any of various devices that enable the TCU 108, RSUs 110, RUC service provider cloud 118, and/or OEM cloud 120 to send and/or receive data from external devices over networks. Examples of suitable network devices 1408 include an Ethernet interface, a Wi-Fi transceiver, a Li-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:
1. A vehicle for computing vehicle-centric road usage without high definition (HD) road maps, comprising:
a vehicle-to-everything (V2X) transceiver;
a memory maintaining a vehicle-based road usage charge application; and a processor programmed to execute the vehicle-based road usage charge application to perform operations including to
  receive, via the V2X transceiver, road usage charging (RUC) charge geometry rules defining a zone in which RUC are charged,
  determine a roadway type based on captured sensor data indicative of the surroundings of the vehicle, the roadway type being selected from a plurality of roadway types including a first roadway type where RUC charge is incurred and a second roadway type where RUC charge is not incurred, the determination including to perform a semantic segmentation of the captured sensor data, to create an output labeling different elements in the captured sensor data, and infer the determined roadway type according to the labeling of the elements, based on a quantity and/or total area of pixels of the captured sensor data being consistent with the determined roadway type,
  identify applicable rules of the RUC charge geometry rules according to a current location of the vehicle, the applicable rules specifying how tariffs are computed for the determined roadway type,
  utilize a state machine to accumulate vehicle RUC charge using vehicle bus data indicative of progress of the vehicle within the zone and the determined roadway type, the state machine including a plurality of states, the plurality of states including a first state in which the vehicle is traversing the first roadway type where RUC charge is incurred and a second state in which the vehicle is traversing the second roadway type where RUC charge is not incurred;
  transition from the first state to the second state responsive to the current location being indicative of the vehicle traveling down the second roadway type within the zone; and
  transition from the second state to the first state responsive to the current location being indicative of the vehicle traveling down the first roadway type within the zone; and
  provide, via the V2X transceiver, a message indicative of the vehicle RUC charge.

2. The vehicle of claim 1, wherein the elements include trees and/or a gravel roadway, and the determined roadway type is a private roadway for which RUC charge is not incurred.

3. The vehicle of claim 1, wherein the elements include traffic controls and/or a paved roadway, and the determined roadway type is a public roadway for which RUC charge is incurred.

4. The vehicle of claim 1, wherein the processor is further programmed to infer the determined roadway type according to a count of the different elements in the captured sensor data.

5. The vehicle of claim 1, wherein the processor is further programmed to infer the determined roadway type according to an overall area of the different elements in the captured sensor data.

6. The vehicle of claim 1, wherein the applicable rules specify how the tariffs are computed for factors including one or more of vehicle type, duration of travel, distance of travel, time of day.

7. The vehicle of claim 1, wherein the current location is determined using a global navigation satellite system (GNSS) controller of the vehicle.

8. The vehicle of claim 1, wherein the RUC charge geometry rules are received from one or more of:
  a roadside unit in proximity to the vehicle;
  a RUC service provider cloud over a communications network; or
  via an access point name (APN) connection through a original equipment manufacturer (OEM) cloud to provide secure communication to the RUC service provider cloud.

9. A method for computing vehicle-centric road usage without high definition (HD) road maps, comprising:
  receiving, via a vehicle-to-everything (V2X) transceiver of a vehicle, road usage charging (RUC) charge geometry rules defining a zone in which RUC are charged;
  determining, by the vehicle, a roadway type based on captured sensor data indicative of the surroundings of the vehicle, the roadway type being selected from a plurality of roadway types including a first roadway type where RUC charge is incurred and a second roadway type where RUC charge is not incurred, the determining including to perform a semantic segmentation of the captured sensor data, to create an output labeling different elements in the captured sensor data, and infer the determined roadway type according to the labeling of the elements, based on a quantity and/or total area of pixels of the captured sensor data being consistent with the determined roadway type;
  identifying, by the vehicle, applicable rules of the RUC charge geometry rules according to a current location of the vehicle, the applicable rules specifying how tariffs are computed for the determined roadway type;
  utilizing a state machine to accumulate, by the vehicle, vehicle RUC charge using vehicle bus data indicative of progress of the vehicle within the zone and the determined roadway type, the state machine including a plurality of states, the plurality of states including a first state in which the vehicle is traversing the first roadway type where RUC charge is incurred and a second state in which the vehicle is traversing the second roadway type where RUC charge is not incurred;
  transitioning from the first state to the second state responsive to the current location being indicative of the vehicle traveling down the second roadway type within the zone; and
  transitioning from the second state to the first state responsive to the current location being indicative of the vehicle traveling down the first roadway type within the zone; and
  providing, via the V2X transceiver, a message indicative of the vehicle RUC charge.

10. The method of claim 9, wherein the elements include trees and/or a gravel roadway, and the determined roadway type is a private roadway for which RUC charge is not incurred.

11. The method of claim 9, wherein the elements include traffic controls and/or a paved roadway, and the determined roadway type is a public roadway for which RUC charge is incurred.

12. The method of claim 9, further comprising inferring the determined roadway type according to a count of the different elements in the captured sensor data.

13. The method of claim 9, further comprising inferring the determined roadway type according to an overall area of the different elements in the captured sensor data.

14. The method of claim 9, wherein the applicable rules specify how the tariffs are computed for factors including one or more of vehicle type, duration of travel, distance of travel, time of day.

15. The method of claim 9, wherein the RUC charge geometry rules are received from one or more of:
- a roadside unit in proximity to the vehicle;
- a RUC service provider cloud over a communications network; or
- via an access point name (APN) connection through a original equipment manufacturer (OEM) cloud to provide secure communication to the RUC service provider cloud.

16. A non-transitory computer-readable medium comprising instructions for computing vehicle-centric road usage without high definition (HD) road maps that, when executed by one or more controllers of a vehicle, cause the vehicle to perform operations including to:
- receive, via a vehicle-to-everything (V2X) transceiver of a vehicle, road usage charging (RUC) charge geometry rules defining a zone in which RUC are charged;
- determine, by the vehicle, a roadway type based on captured sensor data indicative of the surroundings of the vehicle, the roadway type being selected from a plurality of roadway types including a first roadway type where RUC charge is incurred and a second roadway type where RUC charge is not incurred, the determination including to perform a semantic segmentation of the captured sensor data, to create an output labeling different elements in the captured sensor data, and infer the determined roadway type according to the labeling of the elements, based on a quantity and/or total area of pixels of the captured sensor data being consistent with the determined roadway type;
- identify, by the vehicle, applicable rules of the RUC charge geometry rules according to a current location of the vehicle, the applicable rules specifying how tariffs are computed for the determined roadway type;
- utilize a state machine to accumulate, by the vehicle, vehicle RUC charge using vehicle bus data indicative of progress of the vehicle within the zone and the determined roadway type the state machine including a plurality of states, the plurality of states including a first state in which the vehicle is traversing the first roadway type where RUC charge is incurred and a second state in which the vehicle is traversing the second roadway type where RUC charge is not incurred;
- transition from the first state to the second state responsive to the current location
- being indicative of the vehicle traveling down the second roadway type within the zone; and
- transition from the second state to the first state responsive to the current location
- being indicative of the vehicle traveling down the first roadway type within the zone; and
- provide, via the V2X transceiver, a message indicative of the vehicle RUC charge.

* * * * *